(12) United States Patent
Gill

(10) Patent No.: US 6,870,716 B2
(45) Date of Patent: Mar. 22, 2005

(54) FREE LAYER AND DESIGN FOR HIGHER AREAL DENSITY

(75) Inventor: Hardayal Singh Gill, Palo Alto, CA (US)

(73) Assignee: Hitachi Global Storage Technologies Netherland B.V., Amsterdam (NL)

( * ) Notice: Subject to any disclaimer, the term of this patent is extended or adjusted under 35 U.S.C. 154(b) by 277 days.

(21) Appl. No.: 10/255,045

(22) Filed: Sep. 24, 2002

(65) Prior Publication Data

US 2004/0057166 A1 Mar. 25, 2004

(51) Int. Cl.$^7$ .................................................. G11B 5/39
(52) U.S. Cl. .................................. 360/324.12; 360/126
(58) Field of Search .......................... 360/324.1, 324.11, 360/324.12, 324.2, 317

(56) References Cited

U.S. PATENT DOCUMENTS

| | | | |
|---|---|---|---|
| 5,408,377 A | 4/1995 | Gurney et al. .............. 360/113 |
| 5,648,885 A | 7/1997 | Nishioka et al. ............ 360/113 |
| 5,849,422 A | 12/1998 | Hayashi ...................... 428/611 |
| 5,930,085 A | 7/1999 | Kitade et al. ............... 360/113 |
| 5,949,623 A | 9/1999 | Lin ............................ 360/113 |
| 6,074,767 A | 6/2000 | Lin ............................ 428/692 |
| 6,127,045 A * | 10/2000 | Gill ............................ 428/611 |
| 6,133,732 A | 10/2000 | Hayashi ...................... 324/252 |
| 6,168,860 B1 | 1/2001 | Daughton ................... 428/332 |
| 6,201,673 B1 | 3/2001 | Rottmayer et al. ..... 360/324.12 |
| 6,249,405 B1 | 6/2001 | Hoshiya et al. .......... 360/324.1 |
| 6,266,218 B1 | 7/2001 | Carey et al. ........... 360/324.12 |
| 6,291,087 B1 | 9/2001 | Xiao et al. .................. 428/682 |
| 6,292,335 B1 | 9/2001 | Gill ........................ 360/324.11 |
| 6,301,089 B1 * | 10/2001 | Saito et al. ............ 360/324.12 |
| 6,338,899 B1 * | 1/2002 | Fukuzawa et al. .......... 428/332 |
| 6,466,417 B1 * | 10/2002 | Gill ....................... 360/324.12 |
| 6,665,155 B2 * | 12/2003 | Gill ....................... 360/324.12 |
| 6,674,617 B2 * | 1/2004 | Gill ....................... 360/324.12 |
| 2001/0028540 A1 | 10/2001 | Sakaguci et al. ....... 360/324.12 |
| 2001/0028541 A1 | 10/2001 | Gill ....................... 360/324.12 |
| 2001/0033466 A1 | 10/2001 | Ooshima et al. ........ 360/324.12 |
| 2001/0040780 A1 | 11/2001 | Pinarbasi ............... 360/324.11 |
| 2002/0024781 A1 | 2/2002 | Ooshima et al. ........ 360/324.12 |
| 2002/0034057 A1 | 3/2002 | Noma et al. ............ 360/324.12 |
| 2002/0051328 A1 | 5/2002 | Hasegawa ................... 360/322 |
| 2002/0051897 A1 | 5/2002 | Saito et al. .................. 428/692 |
| 2002/0069511 A1 | 6/2002 | Hasegawa et al. ....... 29/603.14 |
| 2002/0081458 A1 | 6/2002 | Hasegawa et al. .......... 428/692 |

FOREIGN PATENT DOCUMENTS

| | | | |
|---|---|---|---|
| DE | 19830343 | 4/2000 | ........... H01F/10/00 |
| JP | 2001-52315 | 2/2001 | ............ G11B/5/39 |
| JP | 2001-155313 | 6/2001 | ............ G11B/5/39 |

OTHER PUBLICATIONS

Veloso, Anabela, et al., "Spin Valves with Synthetic Ferrimagnet and Antiferromagnet Free and Pinned Layers", IEEE Transactions on Magnetics, vol. 35, No. 5, Sep. 1999.

Saito, Masamichi, et al., "PtMn Spin Valve with Synthetic Ferrimagnet Free and Pinned Layers", Journal of Applied Physics, vol. 87, No. 9, May 1, 2000.

IBM Research Disclosure, pp. 95, 1420–1421, and 1425, Aug. 2001 and Jan. 2002.

* cited by examiner

*Primary Examiner*—Jefferson Evans
(74) *Attorney, Agent, or Firm*—Zilka-Kotab, PC; Dominic M. Kotab

(57) ABSTRACT

A magnetic head having a first layer having a positive magnetostriction and a second layer coupled to the first layer. The second layer has a negative magnetostriction that counteracts at least a portion of the positive magnetostriction of the first layer so that the net effective magnetic anisotropy of the layers together is reduced or essentially cancelled, thereby increasing a sensitivity of the layer(s) to external magnetic fields.

18 Claims, 4 Drawing Sheets

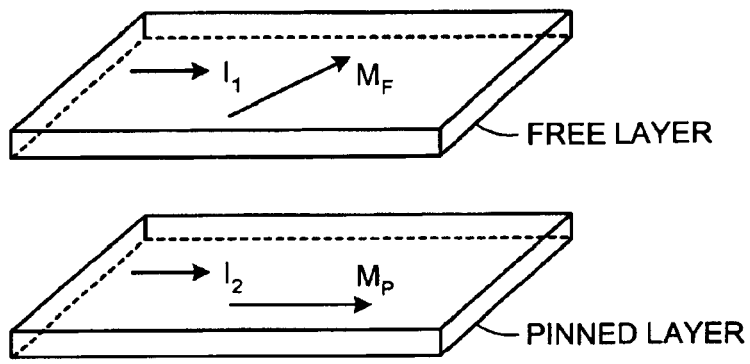
FIG. 2B (Prior Art)
FIG. 2C (Prior Art)
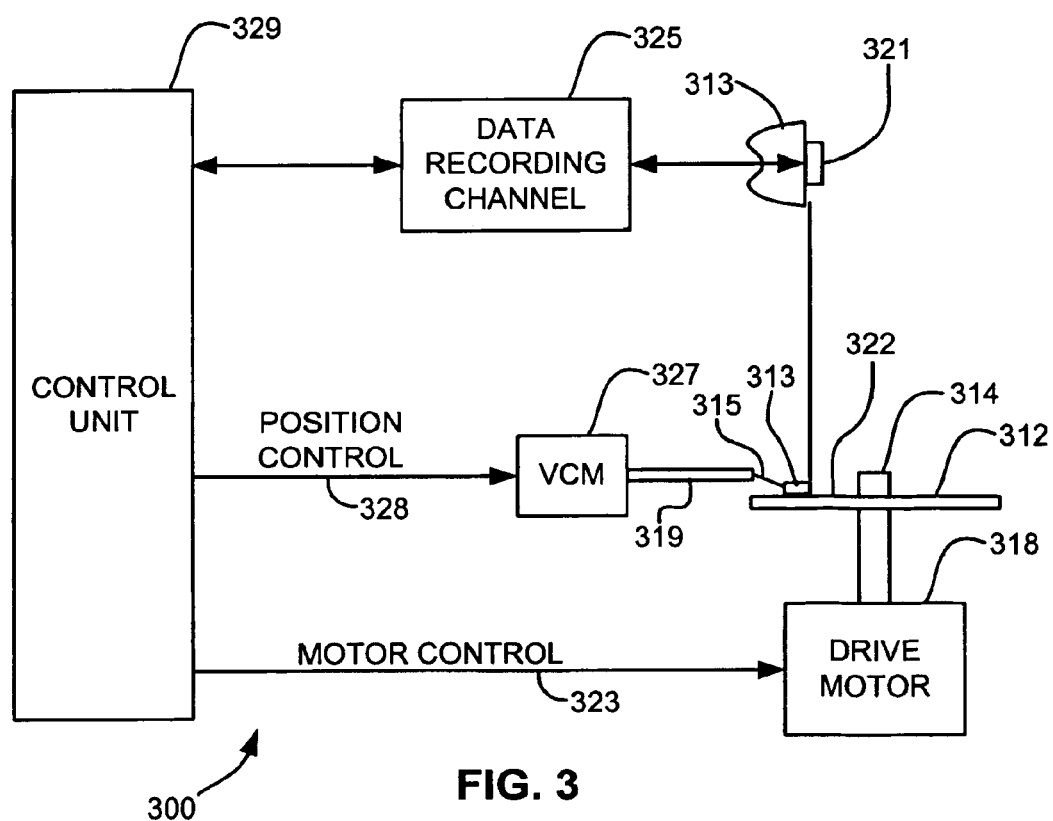
FIG. 3

FREE LAYER AND DESIGN FOR HIGHER AREAL DENSITY

FIELD OF THE INVENTION

The present invention relates to magnetic read heads, and more particularly, this invention relates to a free layer having a reduced net magnetic moment causing heightened sensitivity to external magnetic forces.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization of the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect (SV effect). In a spin valve sensor, one of the ferromagnetic layers, referred to as the pinned layer, has its magnetization typically pinned by exchange coupling with an antiferromagnetic (e.g., NiO, FeMn, PtMn) layer. The magnetization of the other ferromagnetic layer, referred to as the free layer, however, is not fixed and is free to rotate in response to the field from the recorded magnetic medium (the signal field). In spin valve sensors, the spin valve effect varies as the cosine of the angle between the magnetization of the pinned layer and the magnetization of the free layer. Recorded data can be read from a magnetic medium because the external magnetic field from the recorded magnetic medium causes a change in the direction of magnetization in the free layer, which in turn causes a change in resistance of the spin valve sensor and a corresponding change in the sensed current or voltage. It should be noted that the AMR effect is also present in the spin valve sensor free layer.

FIG. 1 shows a typical spin valve sensor 100 (not drawn to scale) comprising end regions 104 and 106 separated by a central region 102. The central region 102 has defined edges and the end regions are contiguous with and abut the edges of the central region. A free layer (free ferromagnetic layer) 110 is separated from a pinned layer (pinned ferromagnetic layer) 120 by a non-magnetic, electrically-conducting spacer 115. The magnetization of the pinned layer 120 is fixed through exchange coupling with an antiferromagnetic (AFM) 125. An underlayer 126 is positioned below the AFM layer 125.

The underlayer 126, or seed layer, is any layer deposited to modify the crystallographic texture or grain size of the subsequent layers, and may not be needed depending on the substrate. A variety of oxide and/or metal materials have been employed to construct underlayer 126 for improving the properties of spin valve sensors. Often, the underlayer 126 may be formed of tantalum (Ta), zirconium (Zr), hafnium (Hf), or yttrium (Y). Ideally, such layer comprises NiFeCr in order to further improve operational characteristics. In particular, NiFeCr underlayer has been very successful in improving operational characteristics such as $\Delta R/R$.

Free layer 110, spacer 115, pinned layer 120, the AFM layer 125, and the underlayer 126 are all formed in the central region 102. Hard bias layers 130 and 135 formed in the end regions 104 and 106, respectively, provide longitudinal bias for the free layer 110. Leads 140 and 145 formed over hard bias layers 130 and 135, respectively, provide electrical connections for the flow of the sensing current $I_s$ from a current source 160 to the MR sensor 100. Sensor 170 is connected to leads 140 and 145 senses the change in the resistance due to changes induced in the free layer 110 by the external magnetic field (e.g., field generated by a data bit stored on a disk). IBM's U.S. Pat. No. 5,206,590 granted to Dieny et al. and incorporated herein by reference, discloses an MR sensor operating on the basis of the spin valve effect.

Another type of spin valve sensor is an antiparallel (AP)-pinned spin valve sensor. FIG. 2A shows an exemplary AP-Pinned spin valve sensor 200 (not drawn to scale). Spin valve sensor 200 has end regions 202 and 204 separated from each other by a central region 206. AP-pinned spin valve sensor 200 comprises a Ni—Fe free layer 225 separated from a laminated AP-pinned layer 210 by a copper spacer layer 220. The magnetization of the laminated AP-pinned layer 210 is fixed by an AFM layer 208, or pinning layer, which is made of NiO. Again, beneath the AFM layer 208 is an underlayer 209. The laminated AP-pinned layer 210 includes a first ferromagnetic layer 212 (PF1) of cobalt and a second ferromagnetic layer 216 (PF2) of cobalt separated from each other by a ruthenium (Ru) antiparallel coupling layer 214. The AMF layer 208, AP-pinned layer 210, copper spacer 220, free layer 225 and a cap layer 230 are all formed sequentially in the central region 206. Hard bias layers 235 and 240, formed in end regions 202 and 204, provide longitudinal biasing for the free layer 225. Electrical leads 245 and 250 are also formed in end regions 202 and 204, respectively, to provide electrical current from a current source (not shown) to the spin valve sensor 200.

Various parameters of a spin valve sensor may be used to evaluate the performance thereof. A couple of examples of such parameters are the structure sheet resistance (R) and GMR ratio (ΔR/R). The GMR ratio (ΔR/R) is defined as $(R_{AP}-R_P)/R_P$, where $R_{AP}$ is the antiparallel resistance and $R_P$ is the parallel resistance.

Numerous theoretical studies have attempted to explain the behavior of spin valve effects. However, there does not currently exist an explanation of the main factors controlling the magnitude of the sensor response, as characterized by ΔR/R, as it relates to the required properties of the conductive spacers and ferromagnetic (FM) layers constituting such device. Experimental efforts have been largely based on trial and error, by investigating various combinations of FM layers and conductive spacer layers. None of the previous work has yielded quantitative guidelines for the maximization of ΔR/R for spin valve sensors by providing selection criteria for the layer compositions of the FM material and the conductive spacer.

What is known is that the GMR effect depends on the angle between the magnetizations of the free and pinned layers. More specifically, the GMR effect is proportional to the cosine of the angle β between the magnetization vector of the pinned layer ($M_P$) and the magnetization vector of the free layer ($M_F$) (Note FIGS. 2B and 2C). In a spin valve sensor, the electron scattering and therefore the resistance is maximum when the magnetizations of the pinned and free layers are antiparallel, i.e., majority of the electrons are scattered as they try to cross the boundary between the MR layers. On the other hand, electron scattering and therefore the resistance is minimum when the magnetizations of the pinned and free layers are parallel; i.e., majority of electrons are not scattered as they try to cross the boundary between the MR layers.

One well known way to increase the performance of hard disk drives is to increase the areal data storage density of the magnetic hard disk. This can be accomplished by reducing the written data track width, such that more tracks per inch can be written on the disk.

As bit density is increased, the magnetic fields representing the bits decrease. Those fields are sensed by the sensor. Therefore, the sensitivity of the sensor must be increased. For higher areal densities, e.g., with areal density greater than 300 Gbit/in$^2$, the smaller magnetic fields from the disk may require a thinner free layer to achieve a full signal from the read head.

One possible approach to reading higher areal densities is to use antiparallel coupled free layers with thicknesses below 15 Å. However, the magnetic anisotropy (Hk) from the free layer can become high due to the addition of Hk from the two layers and division by the differences of layer thicknesses, as demonstrated by Equation 1:

$$Hk(\text{effective}) = [t1M1Hk1 + t2M1Hk1]/[t2M2 - t1M1] \quad \text{Equation 1}$$

where:
Hk1=magnetic anisotropy of layer 1;
Hk2=magnetic anisotropy of layer 2;
t1=thickness of layer 1;
t2=thickness of layer 2;
M1=magnetic moment of layer 1; and
M2=magnetic moment of layer 2.

What is needed is a way to simultaneously decrease the net moment of the free layer and also the magnetic anisotropy of the free layer, so that the sensor is sensitive to very small changes in magnetic field.

The present invention solves the aforementioned problems by providing a new design to achieve near zero effective Hk for the free layer. Another benefit of this invention disclosed is that the free layer can be relatively thick, yet will be very sensitive and can therefore be used to read very dense data. Thus, the embodiments of the present invention described herein provide a sensor with sensitivity that is greatly enhanced over prior art sensors.

SUMMARY OF THE INVENTION

The present invention provides the benefits described above by providing a magnetic head having a first layer with a positive magnetostriction and a second layer coupled to the first layer. The second layer has a negative magnetostriction that counteracts at least a portion of the positive magnetostriction of the first layer so that the net effective magnetic anisotropy of the layers together is reduced or essentially cancelled.

These layers together can form at least part of a free layer of a sensor. Because this particular configuration of layers can produce a negligible net effective magnetic anisotropy, the sensor becomes very sensitive to external magnetic fields and is thereby able to sense data in a very compact areal density.

Preferably, a spacer layer is positioned between the first and second layers. The spacer layer is effective to make magnetizations of the first and second layers antiparallel.

In one embodiment, the second layer is electrically resistive so that more electrical current flows through the first layer during sensing. Preferably, the second layer includes Niobium (Nb), ideally in a Co—Nb alloy. Exemplary materials include CoNb, CoFeNb, CoFeNbHf, CoZrNb, NiFe. The second layer preferably includes 2–25 atomic percent Nb.

According to another embodiment, the second layer includes a sublayer that provides the negative magnetostriction. The sublayer may be of an amorphous material and preferably includes Nb. A preferred thickness of the sublayer is between about 5 and 30 Å in a direction perpendicular to a plane extending between the sublayer and the first layer.

Additional layers may also be added to the head.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art FIG. 2B illustrates the MR sensor and the placement of the domain wall of FIG. 2A.

Prior Art FIG. 2C illustrates the cosine of the angle β between the magnetization vector of the pinned layer ($M_P$) and the magnetization vector of the free layer ($M_F$) shown in FIG. 2B.

FIG. 3 is a perspective drawing of a magnetic recording disk drive system in accordance with one embodiment.

BEST MODE FOR CARRYING OUT THE INVENTION

Figure 1:
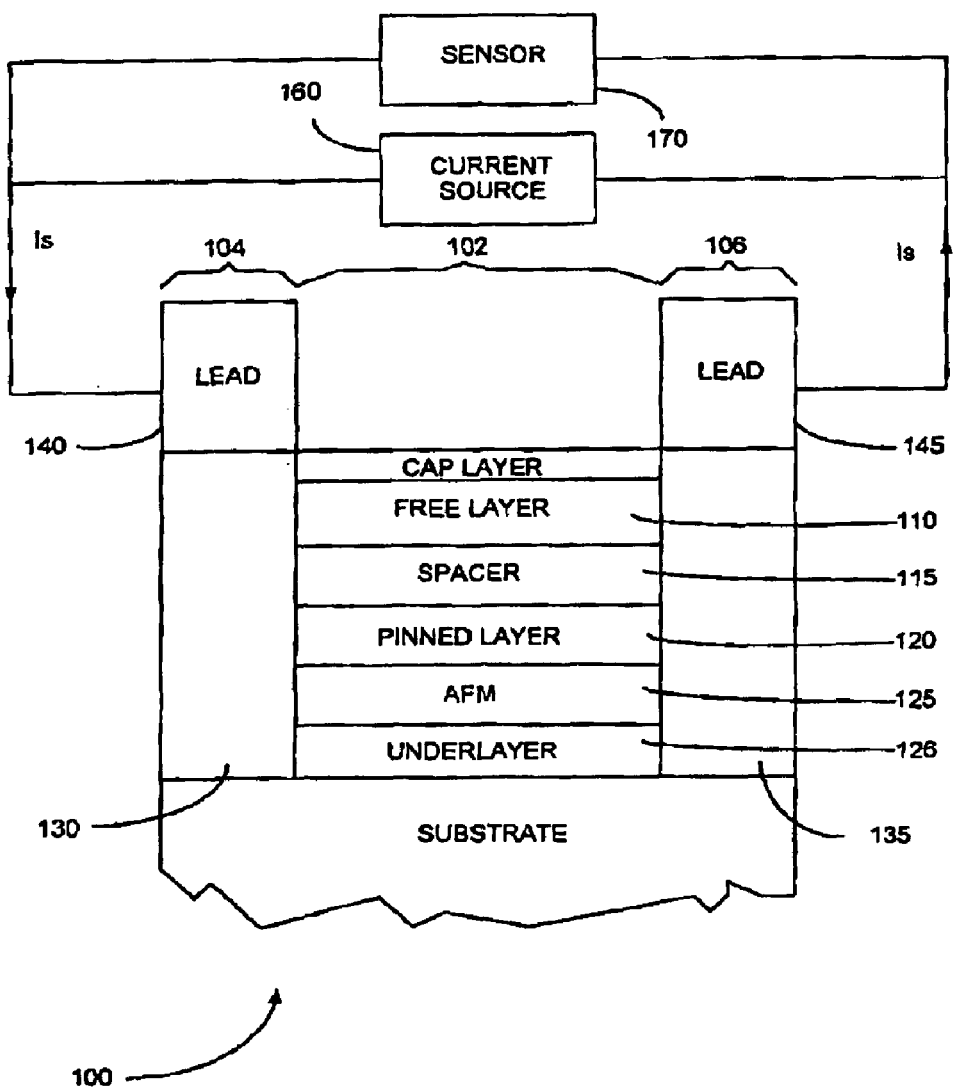
FIG. 1 illustrates a cross-sectional view of a MR head, in accordance with the prior art.
Figure 2A:
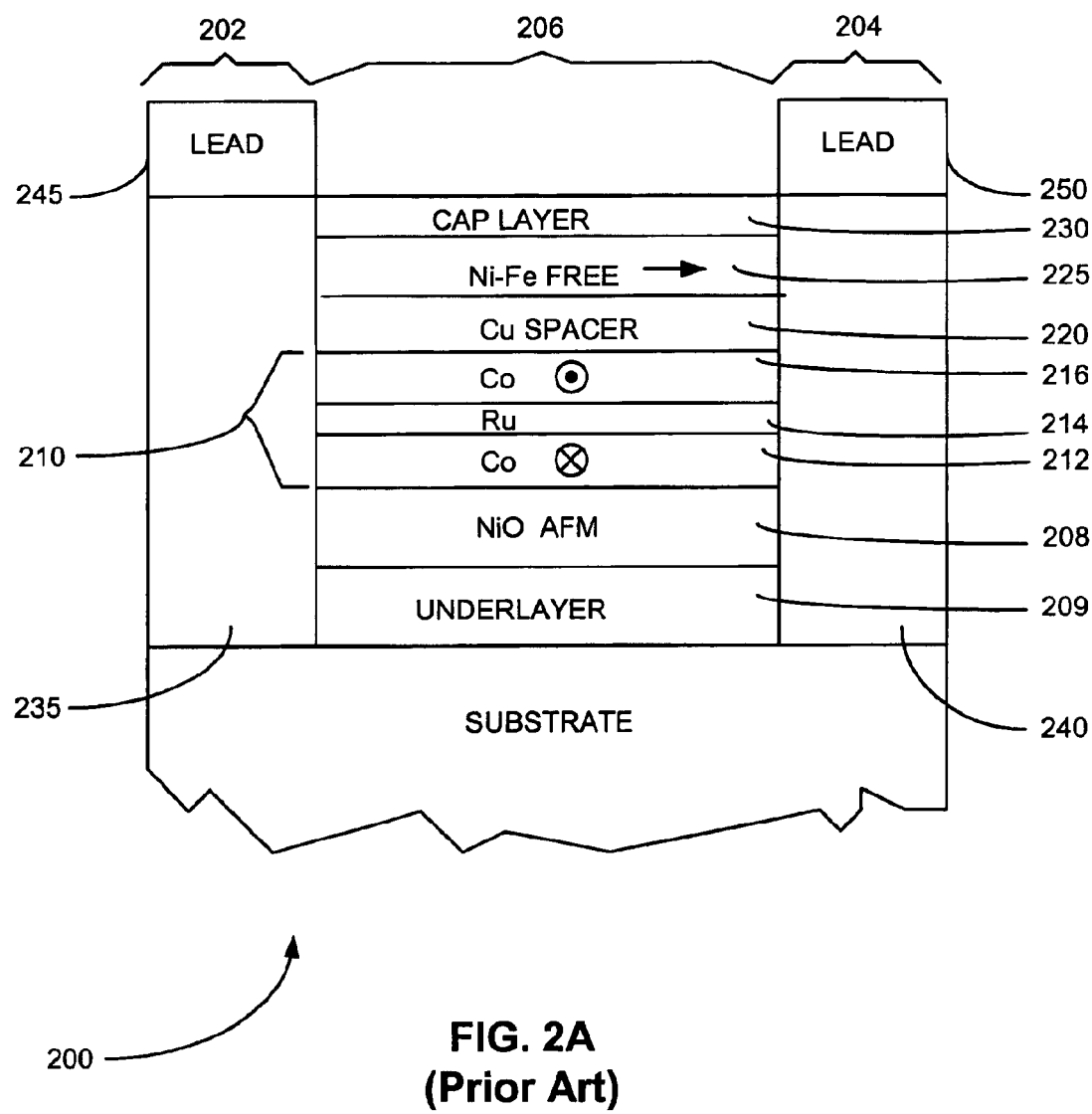
FIG. 2A illustrates a simplified cross-sectional view of the MR head showing the hard bias layer and the MR sensor thereof.

The following description is the best embodiment presently contemplated for carrying out the present invention.

This description is made for the purpose of illustrating the general principles of the present invention and is not meant to limit the inventive concepts claimed herein.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
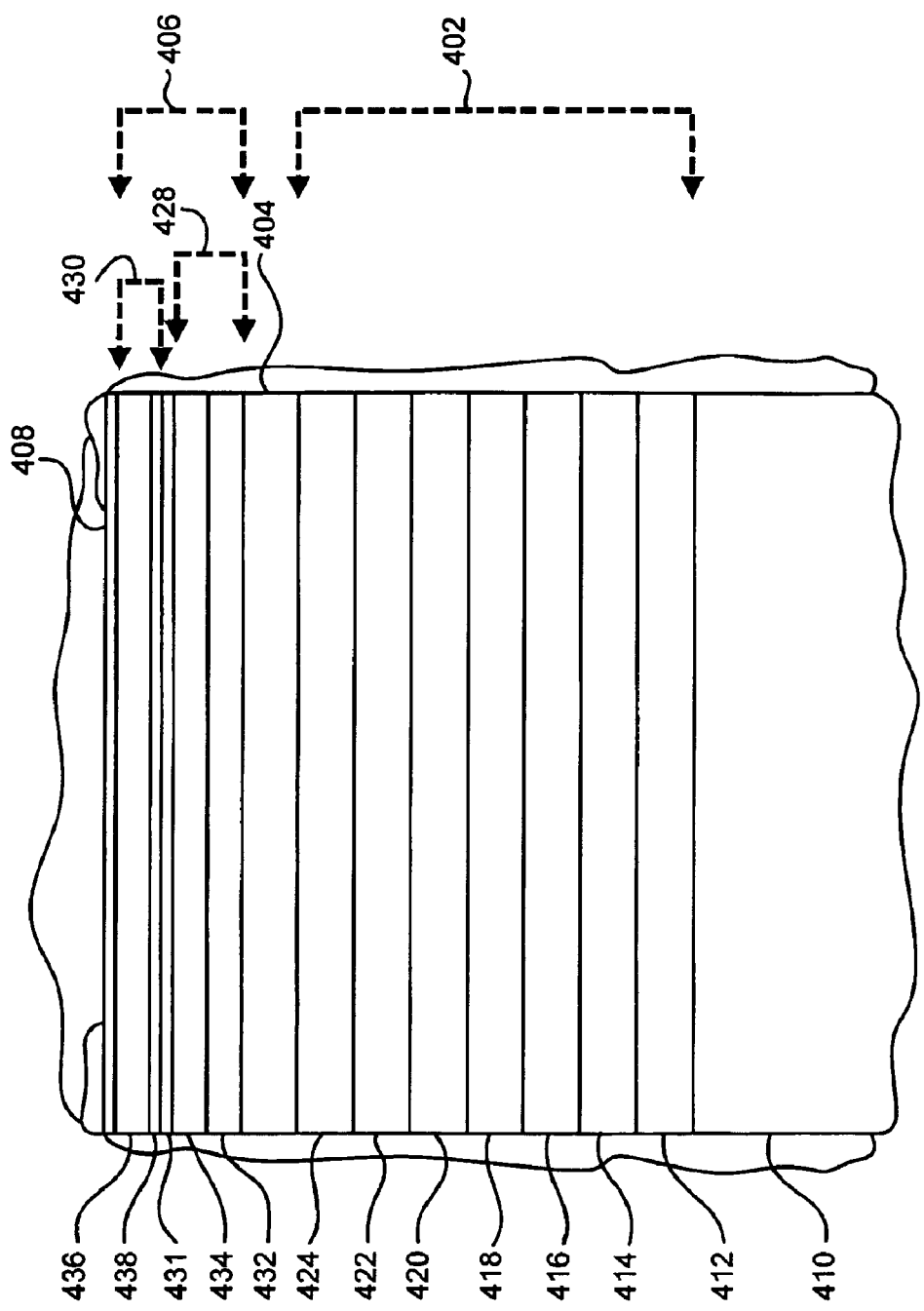
FIG. 4 is a side cross-sectional view of a preferred embodiment of a read head portion of a magnetic head of the present invention.

FIG. 4 depicts a partial structure of a head 400 that can be used in the system of FIG. 3 (not drawn to scale). The head 400 of FIG. 4 is presented by way of example and is of a preferred embodiment that is particularly adapted for use with high areal density media. As shown, the sensor of the head 400 includes several layers, which can generally be categorized as seed and pinned layers 402, a spacer 404, a free layer 406, and a cap 408. The free layer 406 is the focus of the present disclosure, but all layers will be discussed for completeness.

The seed and pinned layers 402 are coupled to a substrate 410. One example of a seed and pinned layer arrangement (with illustrative thicknesses) includes a layer of $Al_2O_3$ 412 (~30 Å), a layer of NiFeCr 414 (~20 Å), a layer of NiFe 416 (~8 Å), a layer of PtMn 418 (~150 Å), a layer of CoFe 420 (~12 Å), a layer of Ru 422 (~8 Å) and a layer of CoFe 424 (~148 Å).

A Cu spacer 404 (~19 Å) is positioned above the seed and pinned layers 402.

The free layer 406 includes first and second layers 428, 430. Preferably, a spacer layer 431 is positioned between the first and second layers 428, 430 and is effective to make magnetizations of the first and second layers 428, 430 antiparallel. Ru (Ruthenium) is a preferred material for the spacer layer 431, as it has the effect of making the layers 428, 430 antiparallel. Because the layers 428, 430 are antiparallel coupled, the magnetic moments of the layers 428, 430 are essentially zero. Other possible materials in place of Ru include Ir, Cr, Re, and Cu.

Another effect of the antiparallel coupling is that the free layer 406 is constructed such that the magnetostriction of the first layer 428 is positive (giving a positive anisotropy), while the magnetostriction of the second layer 430 is negative (giving a negative anisotropy). In other words, the magnetic anisotropy induced by stress of the second layer 430 is about 90° out of phase with that of the first layer 428. Keep in mind that as used herein, "negative" magnetostriction merely means that the magnetostriction of the second layer 430 is opposite the magnetostriction of the first layer 428.

Using Equation 1, above, to calculate the effective magnetic anisotropy ($Hk_{effective}$), it can be seen that the magnetostrictions counteract each other so that the net effective magnetic anisotropy of the free layer 406 is greatly reduced or essentially at zero. Note that t1, Hk1, and M1 in Equation 1 can refer to values for the first layer 428, while t2, Hk2, and M2 refer to values for the second layer 430, or vice versa.

Because this particular configuration of layers in the free layer 406 produces such a small net effective magnetic anisotropy coupled with the desired magnetic softness, the sensor is very sensitive to external magnetic fields and is thereby able to sense data in a very compact areal density.

In a preferred embodiment, the first layer 428 comprises CoFe ($^{90}/_{10}$). The output signal of the head is proportional to $\Delta R/R$, as described above. $\Delta R/R$ is very high for CoFe. As an option, a sublayer of NiFe 434 can be added to the first layer 428 to soften the sublayer of CoFe 432 in the first layer 428, but is not a necessary component. By softening the first layer 428, the entire free layer 406 is softened. The CoFe sublayer 432 is preferably positioned near the spacer 404 to maximize GMR.

A preferred thickness of each sublayer 432, 434 in a direction perpendicular to a plane extending between the first and second layers 428, 430 is between 5 and 20 Å.

During reading, it is desirable that all signal go through the first layer 428 so that signal from the second layer 430 is negligible. Thus, the second layer 430 should be electrically resistive. The second layer 430 may be constructed, at least partially, of an amorphous material, making it electrically resistive so that more electrical current flows through the first layer 428 during sensing.

Like the first layer 428, the second layer 430 can include multiple sublayers, including a sublayer 436 that provides the negative magnetostriction.

A preferred material for the magnetostrictive sublayer 436 is Niobium (Nb), preferably in a Co—Nb alloy. Illustrative Nb-containing materials that can be used in the magnetostrictive sublayer 436 include CoNb, CoFeNb, CoFeNbHf, CoZrNb, etc. The second layer 430 (or sublayer) preferably includes 2–25 (ideally 5–15) atomic percent Nb.

Use of Nb is preferred for three reasons. First, it allows negative magnetostriction. Second, it magnetically softens the first layer 428. Third, it makes the second layer 430 electrically resistive. CoNb for example is amorphous, and so has high electrical resistivity.

A preferred thickness of the magnetostrictive sublayer 436 is between 5 and 30 Å in a direction perpendicular to a plane extending between the first and second layers 428, 430.

The nonmagnetostrictive sublayer 438 of the second layer 430 is preferably CoFe (90/10), selected primarily because the antiparallel coupling between CoFe and Ru is very strong. The nonmagnetostrictive sublayer 438 can be very thin (about 1–10 Å) to make any electrical conductivity therethrough negligible.

Another exemplary configuration of the second layer 428 is a sublayer of CoFe 438 and a sublayer of NiFe 436 (90/10), the latter providing the negative magnetostriction.

A cap layer 408 can be added. Ta is a preferred material for the cap layer 408. Additional layers (not shown) may also be added, including shield layers, hard bias layers, electrical contacts, etc.

Thus, the present invention according to a preferred embodiment has a free layer 406 with both a very low net moment and a very low magnetic anisotropy. In use, a sensor constructed with these features is sensitive to very small changes in magnetic field and is therefore amenable for use with high density media. Another benefit of this invention is that the free layer 406 can be relatively thick, yet will be very sensitive and can therefore be used to read very dense data.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head, comprising:
a first layer having a positive magnetostriction; and
a second layer coupled to the first layer, the second layer having a negative magnetostriction that counteracts at least a portion of the positive magnetostriction of the first layer;
the first layer including a sublayer that magnetically softens the first and second layers and a second sublayer that provides the positive magnetostriction.

2. The magnetic head as recited in claim 1, wherein the layers together form at least part of a free layer of a sensor.

3. A magnetic head, comprising a first layer having a positive magnetostriction, a second layer coupled to the first layer, the second layer having a negative magnetostriction that counteracts at least a portion of the positive magnetostriction of the first layer, and a spacer layer positioned between the first and second layers, the spacer layer being effective to make magnetizations of the first and second layers antiparallel.

4. A magnetic head, comprising a first layer having a positive magnetostriction, a second layer coupled to the first layer, the second layer having a negative magnetostriction that counteracts at least a portion of the positive magnetostriction of the first layer, wherein the second layer is less electrically conductive than the first layer.

5. A magnetic head, comprising a first layer having a positive magnetostriction, a second layer coupled to the first layer, the second layer having a negative magnetostriction that counteracts at least a portion of the positive magnetostriction of the first layer, wherein the second layer includes Niobium (Nb).

6. The magnetic head as recited in claim 5, wherein the second layer includes 2–25 atomic percent Nb.

7. A magnetic head, comprising a first layer having a positive magnetostriction, a second layer coupled to the first layer, the second layer having a negative magnetostriction that counteracts at least a portion of the positive magnetostriction of the first layer, wherein the second layer includes a sublayer that provides the negative magnetostriction.

8. The magnetic head as recited in claim 7, wherein the sublayer is of an amorphous material.

9. The magnetic head as recited in claim 7, wherein the sublayer is selected from a group consisting of CoNb, CoFeNb, CoFeNbHf and CoZrNb.

10. The magnetic head as recited in claim 7, wherein a thickness of the sublayer is between 5 and 30 Å in a direction perpendicular to a plane extending between the sublayer and the first layer.

11. A sensor of a magnetic head, comprising:
a first layer having a positive magnetostriction;
a second layer coupled to the first layer, the second layer having a negative magnetostriction that counteracts at least a portion of the positive magnetostriction of the first layer;
a spacer layer positioned between the first and second layers, the spacer layer being effective to make magnetizations of the first and second layers antiparallel;
wherein the second layer is less electrically conductive than the first layer.

12. The sensor as recited in claim 11, wherein the second layer is electrically resistive.

13. The sensor as recited in claim 11, wherein the second layer includes Niobium (Nb).

14. The sensor as recited in claim 13, wherein the sublayer includes 2–25 atomic percent Nb.

15. The sensor as recited in claim 11, wherein the second layer includes a sublayer that provides the negative magnetostriction.

16. The sensor as recited in claim 15, wherein the sublayer is selected from a group consisting of CoNb, CoFeNb, CoFeNbHf, and CoZrNb.

17. The sensor as recited in claim 15, wherein a thickness of the sublayer perpendicular to a plane extending between the sublayer and the first layer is between 5 and 30 Å.

18. A magnetic storage system, comprising:
magnetic media;
at least one head for reading from and writing to the magnetic media, each head having:
a read portion including:
a first layer having a positive magnetostriction;
a spacer layer coupled to the first layer;
a second layer coupled to the spacer layer, the second layer having a negative magnetostriction that counteracts at least a portion of the positive magnetostriction of the first layer, wherein the second layer is less electrically conductive than the first layer;
a write element coupled to the read portion; and
a slider for supporting the head; and
a control unit coupled to the bead for controlling operation of the head.

* * * * *

UNITED STATES PATENT AND TRADEMARK OFFICE
CERTIFICATE OF CORRECTION

PATENT NO. : 6,870,716 B2
DATED : March 22, 2005
INVENTOR(S) : Gill

It is certified that error appears in the above-identified patent and that said Letters Patent is hereby corrected as shown below:

Title page,
Item [54], Title, remove word "AND"

Column 8,
Line 64, change "bead" to -- head --.

Signed and Sealed this

Seventeenth Day of May, 2005

JON W. DUDAS
*Director of the United States Patent and Trademark Office*